COLOR IMAGE REPRODUCING APPARATUS

Filed Dec. 14, 1953

Inventor:
Robert B. Dome,
by Donald R. Timbie
His Attorney.

April 22, 1958 R. B. DOME 2,831,918

COLOR IMAGE REPRODUCING APPARATUS

Filed Dec. 14, 1953 2 Sheets-Sheet 2

Inventor:
Robert B. Dome,
by Donald N. Timbie
His Attorney.

United States Patent Office 2,831,918
Patented Apr. 22, 1958

2,831,918

COLOR IMAGE REPRODUCING APPARATUS

Robert B. Dome, Geddes Township, Onondaga County, N. Y., assignor to General Electric Company, a corporation of New York Application December 14, 1953, Serial No. 398,058

12 Claims. (Cl. 178—5.4)

This invention relates to apparatus for reproducing images in color in response to video signals.

Both single gun and triple gun cathode-ray tubes have been used for the purpose. The former requires a large amount of switching power if each of the selected component colors are to be produced at a sequential rate of the order of megacycles per second. This is desirable in some systems. The triple gun type presents the problem of securing satisfactory registration of the three beams as they scan a raster on the target structure of the tube.

In accordance with one of the objects of this invention, apparatus for reproducing images in color in response to video signals is provided wherein the amount of switching power is drastically reduced and wherein the registration problem is reduced.

It is another object of this invention to provide an improved cathode-ray tube for reproducing images in color.

Briefly, this may be accomplished by providing a cathode-ray tube having a lined phosphor screen, two electron guns, means for modulating the intensity of one beam in accordance with the intensity of one component color, means for sequentially modulating the other beam in accordance with the intensities of two other selected component colors, and means for deflecting the second electron beam from one color phosphor to a phosphor of another color in synchronism with the sequential modulation of the beam so that the beam always strikes a phosphor corresponding in color to the color represented by the modulation. The first beam is generally deflected at the same rate as the second beam and means are provided for making sure that the first beam always strikes a phosphor of the same color.

The manner in which the above objective, as well as advantages of this invention, may be attained will be better understood after the following discussion of the drawings in which.

Although this invention may be used in any system where three color signals are provided, it will be described in connection with a television receiver designed for operation with presently standardized synchronizing signals. In this part of the discussion, it is assumed that the color information is transmitted in any manner that provides substantially simultaneous video signals each representing the intensity variation of a different selected component color such as green, red and blue, respectively.

Figure 1:
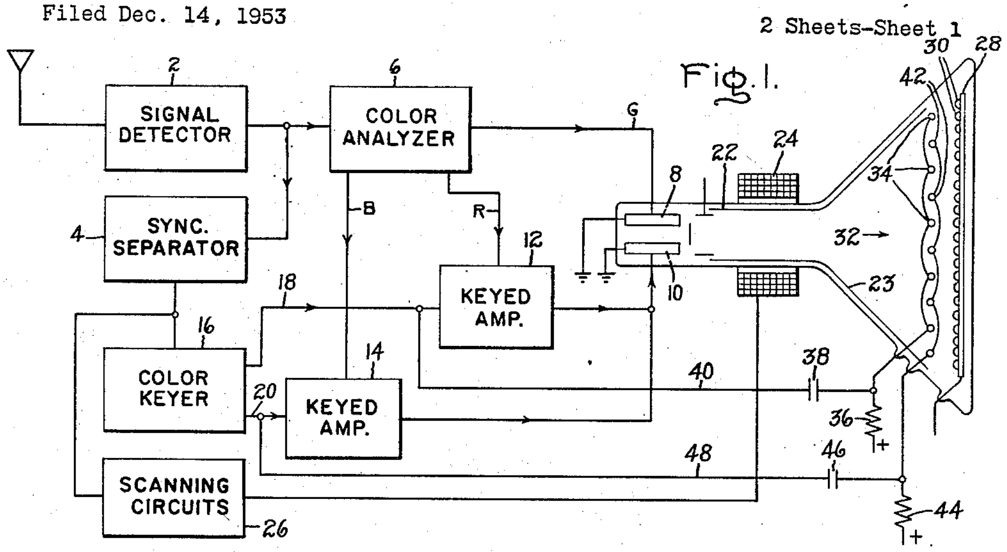
Figure 1 is a schematic block diagram illustrating one embodiment of the invention.

In Figure 1, the synchronizing signals and image signals recovered by a detector 2 are applied to a synchronizing pulse separator 4 (hereafter called a "sync separator") that isolates the synchronizing signals, and also to a color analyzer 6 that provides the green, red and blue video signals at separate outputs. Except for blanking intervals, the green video signals are continuously applied to the control grid (not shown) of an electron gun 8 so as to modulate the intensity of the electrons in the beam projected therefrom.

Figure 3:
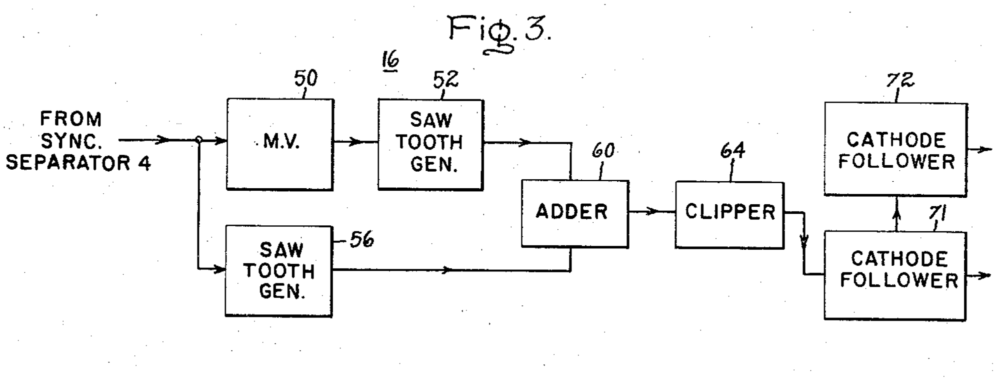
Figure 3 illustrates in block diagram one type of color keyer that may be used in the arrangement shown in Figure 1.

In the following manner, the red and blue video signals are applied sequentially to the control electrode (not shown) of a second electron gun 10 so as to control the intensity of electrons in the beam of electrons projected therefrom. The red video signals are applied to a keyed amplifier 12 and the blue video signals are applied to a keyed amplifier 14. The outputs of the keyed amplifiers are applied to the control grid (not shown) of the electron gun 10. A color keyer 16, one form of which is shown in Figure 3, produces two switching waves that are 180° out of phase with each other. In the arrangement shown, the color keyer 16 is connected to the output of the sync separator 4 so that the time of occurrence of the waves is controlled by at least some of the synchronizing signals. One of the switching waves is applied to the keyed amplifier 12 via a lead 18 so as to render the amplifier alternately conductive and non-conductive. When the amplifier 12 is conductive, the red video signals are permitted to reach the control electrode of the electron gun 10. The other switching wave is applied via a lead 20 to the keyed amplifier 14 so as to render the amplifier alternately non-conductive and conductive. Because the latter switching wave is 180° out of phase with the switching wave applied to the amplifier 12, the amplifier 14 is conductive when the amplifier 12 is non-conductive and vice versa. Hence, the blue video signals are applied to the control electrode of the electron gun 10 alternately with the red video signals.

In a manner well known to those skilled in the art, the beams of electrons projected by the guns 8 and 10 are converged by application of a suitable positive potential to a convergence electrode 22. The converged beams are deflected horizontally and vertically in the usual manner by a sweep yoke 24 that is energized in the customary manner by scanning circuits 26. The scanning circuits 26 are controlled in turn by synchronizing signals obtained from the output of the sync separator 4 in conventional manner.

Figure 1A:
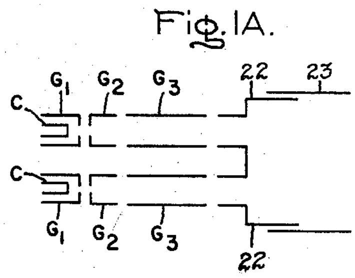
Figure 1A is an enlarged view of the electron gun structure used on the cathode-ray tube of Figure 1.

Figure 1A illustrates one type of gun structure that may be used to provide the converging beams. The cathodes C are usually at ground potential and the control grids $G_1$ are connected so as to receive the video signals. The screen grids $G_2$ may be operated at 300 volts and the first anodes $G_3$ may be operated at 4000 volts. The convergence electrode 22 which is in the form of a cup with two holes in the bottom may be operated at a voltage in the order of 4000 to 5000 volts and the coating 23 inside the neck and flange of the tube may be operated at a voltage in the order of 5000 volts. It will be understood that other structure or voltages may be used without altering the invention.

The target structure towards which the beams of electrons are directed is shown as being comprised of an electrically conductive transparent plate 28 having parallel strips 30 of different color-responsive phosphors mounted on the beam side of the plate. It is also possible to place the strips of phosphor on a suitable surface and to coat the beam side of the strips with a thin electron-permeable metallic coating. A grid 32 of coplanar conductors that are substantially parallel to the lines of phosphors is mounted adjacent to the strips 30 of the phosphors.

The plate 28 may be maintained at 20,000 volts and the average potential of the grid 32 may be 4800 volts. In this manner, the electrons in the beams are accelerated in the region between the grid 32 and the plate 28. It is preferable that the plane formed by the beams be perpendicular to the conductors of the grid 32. Alternate conductors 34 of the grid 32 are electrically connected together. They are also connected to a source of fixed positive potential via a suitable resistor 36 and to the lead 18 via a capacitor 38 and a lead 40. Hence, the same switching wave that operates the keyed amplifier 12, to control the application of the red video signals to the gun 10, is applied to the conductors 34. The remaining conductors 42, i. e. those that are interleaved with the conductors 34, are also electrically connected together. They are connected to a fixed positive potential via a resistor 44 and to the lead 20 via a capacitor 46 and a lead 48. Hence, the same switching wave that operates the keyed amplifier 14, to control the application of the blue video signal to the gun 10, is applied to the conductors 42. The fixed positive potential applied to each set of conductors is the same. A greater fixed positive potential is applied to the electrically conductive plate 28. For reasons well understood by those skilled in the art, the application of the fixed potential in this manner establishes cylindrical electron lenses between and parallel to adjacent conductors of the grid 32. One side of each cylindrical lens is bounded by a grid conductor 34 and the other by a grid conductor 42. These cylindrical lines focus the beams so that the position of the phosphor lines need not be so accurate and the size of the conductors can be smaller.

Figure 2A:
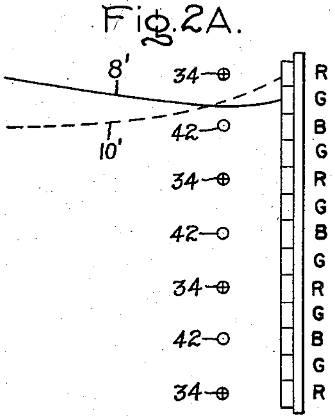
Figures 2A and 2B are similarly enlarged views of the target structure of the cathode-ray tube of Figure 1, illustrating the different switch positions of the beams.
Figure 2B:
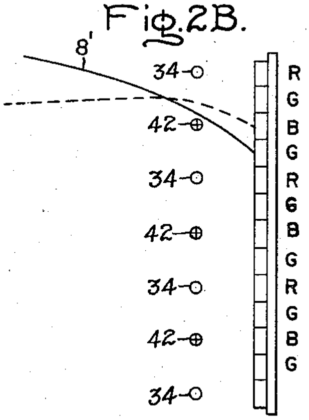

The operation of the cathode-ray tube set forth above is now explained by reference to Figures 2A and 2B, each of which is the same enlarged side view of the target structure of the tube. For convenience, corresponding parts are indicated by the same numerals as in Figure 1. The colors of the light produced by the phosphor lines are indicated by the letters R for red, G for green and B for blue. It will be noted that the sequence of the phosphor lines is RGBGRGBG etc. The red phosphor lines are centered on corresponding conductors 34; the blue phosphor lines are centered on corresponding conductors 42 and the green phosphor lines are symmetrically disposed with respect to adjacent conductors 34 and 42. When, as in Figure 2A, the conductors 34 are positive relative to the conductors 42, the beam 8′ that emanates from the gun 8 impinges on a green phosphor strip. At the same time the electron cylindrical lenses are tilted so as to direct the beam 10′, emanating from the gun 10, to a red phosphor line. Now if the relative polarities of the conductors 34 and 42 are reversed so that the conductors 42 are more positive, as indicated in Figure 2B, the cylindrical electron lenses are tilted so that both of the beams 8′ and 10′ are deflected downward in the space between the grid 32 and the phosphor strips 30. The beam 8′ impinges on a green phosphor line that is below the green phosphor line that the beam 8′ struck in Figure 2A. Hence, in either situation, the beam 8′ strikes a green phosphor line. This is necessary because the beam 8′ is always intensity modulated in accordance with the green video signals. However, the beam 10′ now impinges on a blue phosphor line. It is apparent that when the beam 10′ strikes a red phosphor line, as in Figure 2A, that the beam 10′ must be intensity-modulated in accordance with the red video signals. In the particular embodiment shown in Figure 1, this is accomplished in the following manner. It will be remembered that the switching waves on the leads 18 and 20 are 180° out of phase. Thus during one portion of a cycle of the switching waves, the lead 18 and the conductors 34 may be positive with respect to the lead 20 and the conductors 42 so as to produce the condition illustrated in Figure 2A. In a manner well known to those skilled in the art, the relatively positive voltage on the lead 18 may be applied to the amplifier 12 in such manner as to render it capable of passing the red video signals to the gun 10. At the same time, the relatively negative potential on the lead 20 is applied to the amplifier 14 so as to cut it off and then prevent the blue video signals from reaching the gun 10. During the next portion of a cycle, when the polarities of the switching waves are reversed, the potential on the lead 18 is negative with respect to the lead 20 so that the conductors 34 are relatively negative with respect to the conductors 42 as illustrated in Figure 2B. The potential on the lead 18 is sufficiently negative to cut off the keyed amplifier 12 and the potential on the lead 20 is sufficiently positive to render the keyed amplifier 14 conductive. Hence, during this portion of the cycle of the switching wave, only the blue video signals are permitted to reach the gun 10.

Figure 4:
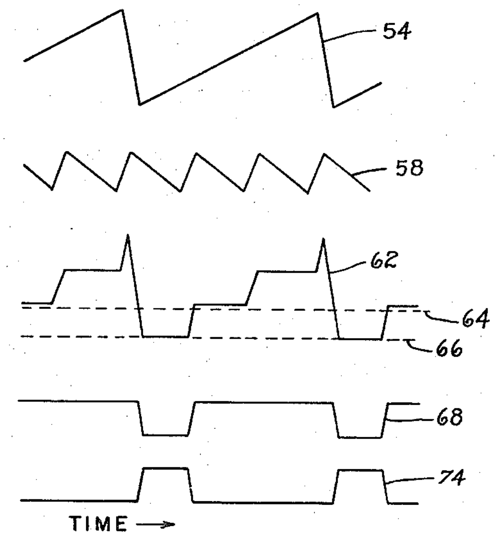
Figure 4 shows a group of electrical waves on a common time scale, used in explaining the operation of the color keyer shown in Figure 3.

The following discussion relates to Figure 3 which illustrates one form that the color keyer 16 may assume. The synchronizing signals that are provided by the sync separator 4 are applied to a multivibrator 50 that is triggered to a different polarity by every third line synchronizing pulse. It will be apparent, to those skilled in the art, that the synchronizing signals could also be obtained from the scanning circuits 26. The construction of such a multivibrator 50 is well known to those skilled in the art and for this reason is not further described. The output of the multivibrator 50 is applied so as to synchronize a sawtooth generator 52. Hence, the output of the sawtooth generator 52 is a sawtooth wave such as 54 of Figure 4. The synchronizing pulses are also applied to a sawtooth generator 56 that is adjusted so as to be triggered by each line synchronizing pulse, thereby producing a sawtooth wave 58 of Figure 4. It will be noted that the wave 58 is 180° out of phase from that normally provided for controlling the line scanning operation. It can be provided by a sawtooth generator of the usual type and a phase inverter, or it can be provided by coupling a phase inverter to the sawtooth generator normally included in the scanning circuits 26. An adder 60 is coupled to the outputs of the sawtooth generators 52 and 56 in such manner as to add the sawtooth waves 54 and 58 and produce a composite wave 62. A clipper 64 is coupled to the output of the adder 60 and operates in a well known manner to pass only that portion of the composite wave lying between the dotted lines 64 and 66. Accordingly, the output of the clipper is a rectangular wave 68. Cathode followers 70 and 72 are coupled in cascade to the output of the clipper 64, cathode follower 72 being excited from the anode circuit of cathode follower 70 to obtain phase reversal. The wave 68 appears with unchanged polarity at the output of the cathode follower 70 and with the opposite polarity as indicated by the wave 74 of Figure 4 at the output of the cathode follower 72. These waves 68 and 74 are the switching waves that are applied to the leads 18 and 20 respectively of Figure 1. It will be noted that the wave 68 is positive for two scanning lines and negative for one and that when it is negative the wave 74 is positive. As a result the red video signals are applied to the gun 10 of Figure 1 for two lines and the blue for one. This sequence is then repeated. Consequently, the vertical definition of the red portion of the final image is twice the vertical definition of the blue portion of the image. This is satisfactory as the eye's acuity for red is greater than it is for blue. The fact that the total number of lines in each sequence; in this case three, two red and one blue; is integrally divisible into the total number of lines in a frame (525) eliminates crawl. However, it will be understood that for the purpose of this invention no particular line sequence of colors is required. In order to avoid the appearance of line structure in the red and blue portions of the image and to thereby reduce flicker, the beam projected by the gun 10 of Figure 1 could be astigmatic so that it has a greater dimension in the vertical direction than it does in the horizontal.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. Apparatus for reproducing images in color comprising in combination a first source of video signals representing a first selected component color, a second source of video signals representing a second selected component color and a third source of signals representing a third selected component color, a cathode-ray tube having first and second electron guns, means for coupling the output of said first source of video signals to said first electron gun in such manner as to continuously modulate the intensity of the beam projected by that gun, means for sequentially coupling said second and third sources to said second gun in such manner as to modulate the intensity of the beam projected from that gun, said cathode-ray tube also having a target structure, said target structure comprising a grid having two groups of interleaved conductors, a plurality of lines of phosphor mounted in proximity to said grids and on the side of said grid remote from said electron guns, said phosphor lines and said conductors of said grid being substantially parallel, means for causing said beams of electrons to scan a raster on said target structure, means for changing the relative potentials of the groups of conductors in synchronism with the sequential coupling of the second and third sources of video signals to said second electron gun, and means for creating an electrostatic field between said gun and said phosphor lines.

2. Apparatus for reproducing images in color comprising in combination a first source of video signals representing a first selected component color, a second source of video signals representing a second selected component color, and a third source of signals representing a third selected component color, first and second electron guns, means for coupling the output of said first source of video signals to said first electron gun so as to intensity-modulate the beam projected by that gun, means for sequentially coupling the output of said second and third sources to said second gun so that the intensity of the beam of electrons emitted therefrom is sequentially modulated in accordance with the intensities of the second and third selected component colors, means for reproducing light of the first selected component color having an intensity corresponding to the beam of electrons projected by said first gun, and means for sequentially reproducing light of the second and third component colors in response to the beam of electrons projected by said second gun.

3. Apparatus for reproducing images in color comprising in combination a first source of video signals representing a first selected component color, a second source of video signals representing a second selected component color, a third source of video signals representing a third selected component color, a cathode-ray tube having first and second electron guns, means for coupling the output of said first source of video signals to said first electron gun in such manner as to continuously modulate the intensity of the beam projected by that gun, means for sequentially coupling said second and third sources to said second gun in such manner as to modulate the intensity of the beam projected from that gun, said cathode-ray tube also having a target structure and said target structure comprising a grid having two groups of interleaved conductors, the conductors in each group being electrically connected together, a plurality of lines of phosphor material mounted in proximity to said grid and on the side of said grid remote from said electron guns, means for causing said beams of electrons to scan a raster on said target structure.

4. A cathode-ray tube for reproducing images in color comprising in combination an evacuated envelope, first and second electron guns mounted in one end of said envelope, each of said electron guns having electrodes for controlling the intensity of the beam of electrons emitted therefrom, a target structure mounted in the other end of said envelope, said target structure being comprised of a grid having two interleaved groups of conductors and strips of phosphors mounted on a surface that is on the opposite side of said grid from said electron guns, the sequence of said strips being such that successive strips luminescence in first, second, first, third, selected component colors in repeated sequence, the number of strips luminescing with either said second or third component color corresponding to the number of grid conductors in one of said groups, means for electrically connecting the conductors in each group to one another, and means extending through said envelope for making electrical contact with each group of conductors.

5. A cathode-ray tube for reproducing images in color comprising in combination an evacuated envelope, first and second electron guns mounted in one end of said envelope, each of said electron guns having electrodes for controlling the intensity of the beam of electrons emitted therefrom, a target structure mounted in the other end of said envelope, said target structure being comprised of a grid having two interleaved groups of conductors, a transparent electrically-conductive plate mounted on the side of said grid that is remote from said electron guns, and a plurality of lines of materials that emit light when struck by electrons mounted on the side of said plate that is nearer said grid and said electron guns, said lines of material being substantially parallel to said grid wires, said lines of material being formed in a plurality of groups, the sequence of the lines in each group being such that successive lines in each group luminesce in first, second, first, third selected component colors, means for electrically connecting the conductors in each group to one another, means extending through said envelope for making electrical contact with each group of conductors.

6. Apparatus for reproducing images in color comprising in combination an evacuated envelope, two electron guns mounted at one end of said envelope, a target structure mounted at the other end of said envelope, said target structure including first and second groups of interleaved grid members, an electrical conductor extending through said envelope and making electrical contact with each grid member of said first group, another electrical conductor extending through said envelope and making electrical contact with each grid member of said second group, means responsive to the passage of electrons from one of said electron guns between adjacent grid members when said adjacent members have a predetermined relative potential to produce light of a first selected component color, means responsive to the passage of electrons from the other of said electron guns between adjacent grid members when said adjacent grid members have said predetermined relative potential to produce light of a second selected component color, means responsive to the passage of electrons from said one of said electron guns between adjacent grid members to produce light of the first selected component color when said adjacent grid members have a different predetermined relative potential, means responsive to the passage of electrons from the other of said electron guns between adjacent grid members when said adjacent grid members have said different relative potential to produce light of a third selected component color, said electron guns being mounted in such manner that the electron beams projected by said electron guns follow paths that are displaced from one another in the direction of separation of the grid members from one another.

7. Apparatus as set forth in claim 1 having in addition means for superimposing a fixed potential onto the relative potentials applied to each group of conductors, and means for establishing the phosphor lines at a potential that is positive with respect to the fixed potential so as to produce focusing electron lenses between the grid wires and the phosphor lines.

8. A cathode-ray tube for reproducing images in color comprising in combination an evacuated envelope, first and second parallel electron guns mounted in a given plane at one end of said envelope, each of said electron guns having electrodes for controlling the intensity of the beam of electrons emitted therefrom, a target structure mounted in the other end of said envelope, said target structure being comprised of a grid having two interleaved groups of conductors, a transparent electrically-conductive plate mounted on the side of said grid that is remote from said electron guns, and a plurality of lines of materials that emit light when struck by electrons mounted on the side of said plate that is nearer said grid and said electron guns, the plane of said guns intersecting said conductors of said grid, and said lines of material being substantially parallel to said grid wires, said lines of material being in repeated sequences in which the successive lines emit light of a first color, a second color, a third color and the second color respectively, means for electrically connecting the conductors in each group to one another, means extending through said envelope for making separate electrical contact with each group of conductors.

9. Apparatus as set forth in claim 1, wherein the electron guns are in a plane and the plane defined by the beams in the vicinity of said grid structure is at an angle with respect to the conductors of the grid.

10. Apparatus as set forth in claim 1, wherein said lines of phosphor are on repeated sequences, each sequence being such that successive lines emit light of a first color, a second color, a third color and the second color.

11. A cathode-ray tube for reproducing images in color comprising in combination an evacuated envelope, first and second electron guns mounted in a plane at one end of said envelope, each of said guns having electrodes for controlling the intensity of the beam of electrons emitted therefrom, a grid at the other end of said envelope, said grid being comprised of parallel interleaved groups of electrical conductors, means for electrically connecting the conductors of each group together and means for making separate electrical contact with each of said groups from a point outside said envelope, the plane defined by the beam projected by said electron guns in the vicinity of said grid making an angle with the conductors of said grid, means for producing in response to electrons of the beam projected of said first electron guns light of a first color along a line parallel to said conductors of said grid when one of said groups of conductors has a given potential relative to the conductors of the other group, means for producing in response to electrons of the beam projected by said first electron gun light of said first color along another line parallel to said conductors when said one of said groups of conductors has a different given potential relative to the conductors of said other group, means for producing in response to the electrons of the beam projected by said second electron gun, light of a second color along another parallel to said conductors when the said one group of conductors has said given potential relative to said other group of conductors, and means for producing in response to the electrons of the beam projected by said second electron gun light of a third color along still another line parallel to said conductors when said one group of conductors has said different potential relative to the conductors of said other group.

12. A cathode ray tube as set forth in claim 11 wherein the parallel lines along which light is produced in response to said electron beam are arranged in repeated sequences, successive lines of each sequence being capable of emitting light of said first color, said second color, said first color and said third color.

References Cited in the file of this patent

UNITED STATES PATENTS

| | | |
|---|---|---|
| 2,312,792 | Bamford | Mar. 2, 1943 |
| 2,529,485 | Chew | Nov. 14, 1950 |
| 2,532,511 | Okolicsanyi | Dec. 5, 1950 |
| 2,579,705 | Schroeder | Dec. 25, 1951 |
| 2,650,264 | Weimer | Aug. 25, 1953 |
| 2,663,757 | Lubcke | Dec. 22, 1953 |
| 2,682,571 | Okolicsanyi | June 29, 1954 |
| 2,721,288 | Vale | Oct. 18, 1955 |